Jan. 25, 1955  T. WHITE  2,700,258
TAP GRINDING FIXTURE
Filed Sept. 28, 1953
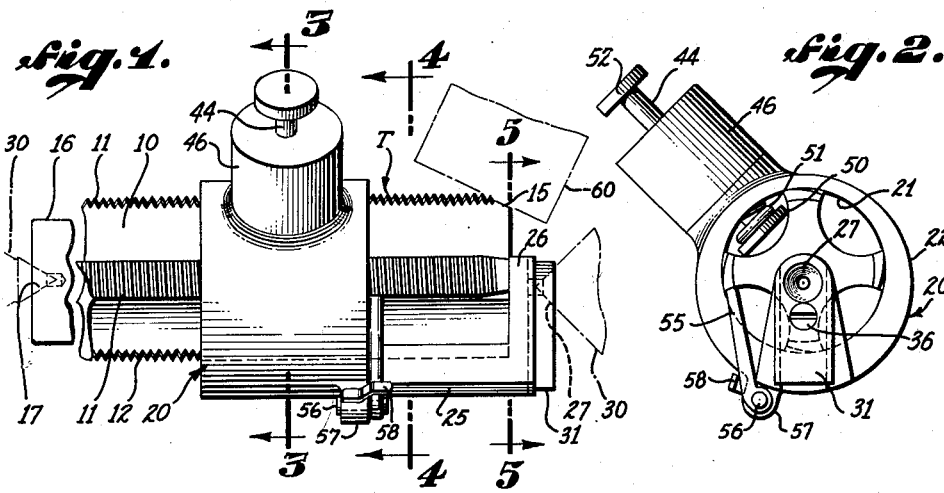
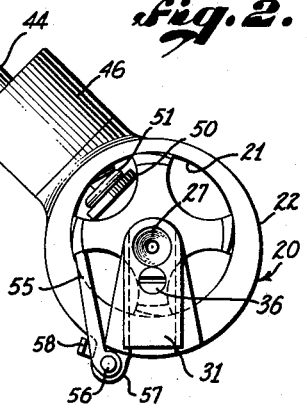
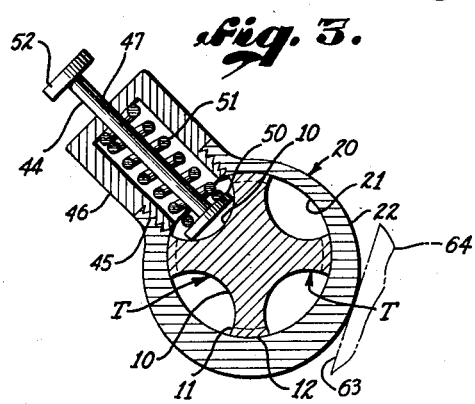
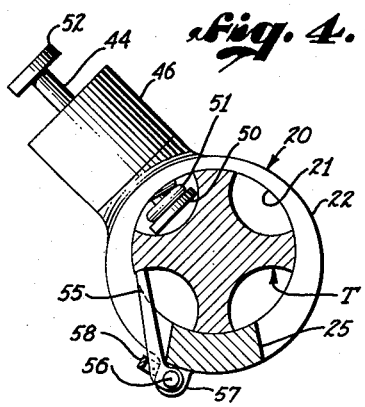
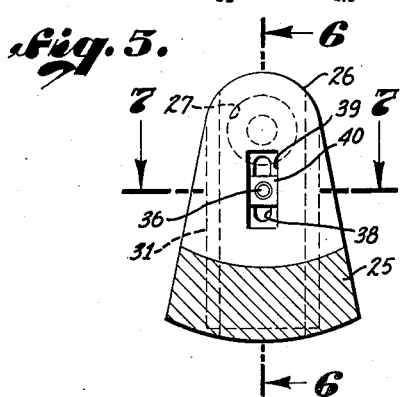
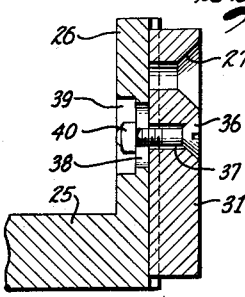
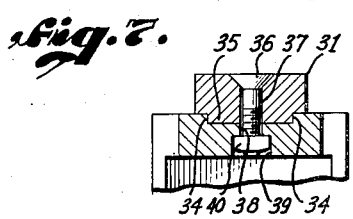
THOMAS WHITE,
INVENTOR.
BY George J. Smythe
ATTORNEY.

2,700,258
Patented Jan. 25, 1955

United States Patent Office

2,700,258

TAP GRINDING FIXTURE

Thomas White, Los Angeles, Calif.

Application September 28, 1953, Serial No. 382,710

9 Claims. (Cl. 51—234)

This invention relates to devices for facilitating accurate tool grinding operations and specifically pertains to a fixture for use in grinding operations to renew or recondition a tap.

A thread-cutting tap of conventional construction has circumferential helical threads and is formed with longitudinal flutes which divide the tap into longitudinal lands, thus dividing the helical threads into cutting teeth. The forward or leading end of the tap is chamfered or tapered by grinding away the crests of the first few threads or teeth. This chamfering accomplishes two purposes in that it causes the work of cutting metal to be distributed over several leading teeth of the tap and also provides a tapered nose to serve as a guide for starting the tap in a bore. Each of the teeth formed by the fluting at the chamfer of the tap has a leading cutting edge and the tooth must be relieved or "backed off" behind the leading cutting edge to provide clearance and to reduce friction. The relief is provided by chamfering the leading end of each land eccentrically so that the heel of each tooth along the chamfer is of less radial dimension than the leading cutting end of the tooth.

Since the work of cutting threads with a tap is concentrated on the leading end of the tap, only the leading teeth are subject to excessive wear and the remaining or rearward teeth usually retain their original sharpness. A worn tap, therefore, may be renewed or reconditioned simply by grinding away material at the leading end of the tap to bring fresh teeth into leading cutting position. The purpose of the regrinding operation is to produce a new chamfer which is at the desired chamfer angle and at the same time is suitably eccentric to cause the teeth at the leading end of each land to be backed off or relieved to the desired degree.

The present invention is a fixture that may be used to grind taps accurately and uniformly by means of various machine tools including lathes, tool and cutter grinders, surface grinders, and similar devices adapted to support a tap between centers. The invention comprises a body having a longitudinal cylindrical passage to receive a tap snugly with the leading end of the tap exposed for grinding operations. The tap is rotatable in the longitudinal passage but is normally releasably held therein against rotation relative to the body.

A portion of the fixture body is in the form of a longitudinal extension that lies along the encircled tap and terminates in an arm that extends across the leading end of the tap. This arm is provided with a forwardly facing centering recess for engagement by the conical center of a machine tool. This centering recess on the fixture body is offset from the axis of the tap encircling passage to cause the tap to move eccentrically when the tap-encircling body is rotated about the axis of the recess. Thus, with the shank end of the tap engaged by one of the two coaxial conical centers of a machine tool and the offset centering recess of the tap-encircling body engaged by the other conical center of the machine tool, the leading end of the tap may be rocked eccentrically while in contact with a grinding wheel to chamfer the leading end of a land. The tap is indexed in the encircling fixture body to bring the lands of the tap successively into grinding position. In this manner, the leading end of each land is ground to the same chamfer angle and with the same degree of relief or back off.

A feature of the preferred practice of the invention is a quick-operating arrangement for releasably holding the tap against rotation relative to the encircling body. Preferably such releasable means includes a spring loaded index member in the form of a plunger to retractibly engage the flutes of the tap. In addition, the preferred form of the invention is provided with a spring-loaded finger or detent member to block relative rotation of the tap in the direction in which the tap tends to rotate in reaction to the grinding wheel.

A further feature of the preferred practice of the invention is that it provides for an accurate grinding operation which may be performed without mounting the tap between a pair of conical centers. This procedure is made possible by forming the tap-encircling body with a cylindrical peripheral surface and locating the tap-encircling passage eccentrically therein. With such an arrangement, rotating the tap-encircling body by hand about the axis of the cylindrical surface with that axis stationary will cause the tap encircled by the body to oscillate in the required eccentric manner for grinding the tap to the required chamfer angle and required degree of relief or back off. As will be explained, the axis of rotation may be held stationary by rotating the fixture body in tangential contact with a suitable support surface.

The features and advantages of the invention may be readily understood from the following detailed description considered with the accompanying drawing.

In the drawing, which is to be considered as merely illustrative:

Figure 1 is a side elevation of the presently preferred embodiment of the invention encircling a tap, the tap being broken away to save space;

Figure 2 is a front end view of the combination shown in Figure 1;

Figure 3 is a transverse section taken as indicated by the line 3—3 of Figure 1;

Figure 4 is a similar section taken on the line 4—4 of Figure 1;

Figure 5 is a transverse section taken as indicated by the line 5—5 of Figure 1;

Figure 6 is a fragmentary longitudinal section taken as indicated by the line 6—6 of Figure 5; and Figure 7 is a section taken as indicated by the line 7—7 of Figure 5.

The drawings illustrate how the invention may be used to recondition a tap generally designated T which is of a conventional type having four longitudinal flutes 10 which divide the tap into four longitudinal lands 11 formed with peripheral cutting teeth 12. The leading end of the tap has the usual chamfer or taper 15 ground eccentrically on each of the lands 11. The tap has the usual shank terminating in a squared end 16 which is provided with the usual centering recess 17 on the axis of the tap.

The present embodiment of the invention is a fixture having a body, designated as a whole by numeral 20, with a longitudinal cylindrical passage 21 therein, dimensioned to encircle the tap T snugly but with sufficient clearance to permit the tap to rotate relative to the body. While the fixture body 20 may be of various configurations in various practices of the invention, preferably the body is in the form of an eccentric sleeve having a cylindrical peripheral surface 22 that is eccentric relative to the longitudinal passage 21.

The body 20 is formed with an integral portion in the form of a longitudinal extension 25 that terminates in a radially inward arm 26. Thus, when the body 20 is slipped over the tap T to the position shown in Figure 1, the leading end of the tap is exposed for grinding operations and the radial arm 26 extends across the forward end of the tap. The purpose of the radial arm 26 is to provide a forwardly facing conical centering recess 27 that is eccentric relative to the axis of the tap-encircling passage 21.

This arrangement makes it possible to mount the tap eccentrically on the two coaxial centers of a machine tool, for example, a tool grinder having two conical centers 30. As indicated in Figure 1, one of the two conical centers 30 engages the recess 17 at the squared end of the tap and the other conical center engages the centering recess 27 in the radial arm 26 of the fixture body 20. It is apparent that rotation of this assembly about the axis of the two conical centers 30 will cause the leading end of the tap to oscillate eccentrically.

While the centering recess 27 may be fixed with respect to its eccentricity, preferably the construction of the fixture permits adjustment of the centering recess with respect to its spacing from the axis of the tap-encircling passage 21. For this purpose, the centering recess 27 may be formed in a separate member 31 that is adjustably mounted on the radial arm 26. In the present construction, the radial arm 26 is formed on its outer face with a radial channel or groove providing two parallel guide shoulders 34 and the adjustable member 31 is formed with a relatively wide rib 35 in sliding engagement with the two guide shoulders. The adjustable member 31 is held in place by a suitable screw 36 that extends through a suitable bore 37 in the adjustable member and extends through a radial slot 38 in the radial arm 26. The inner face of the radial arm 26 is formed with a radial groove or guide channel 39 in which a square nut 40 is slidingly mounted in threaded engagement with the screw 36. It is apparent that the screw 36 may be loosened to permit radial adjustment of the member 31 relative to the radial arm 26 to vary the spacing of the centering recess 27 from the axis of the tap-encircling passage 21 and that the screw 36 may be tightened in the nut 40 to maintain any selected adjustment.

Any suitable means may be provided for releasably engaging the tap T to prevent rotation of the tap relative to the body 20 so that the tap will oscillate with the body in the desired manner to permit grinding the leading ends of the four lands 11 one at a time. In the present embodiment of the invention, the means to releasably engage the tap includes a spring-loaded plunger 44. The fixture body 20 is provided with a radial bore that is threaded to receive the inner threaded end 45 of a cylindrical plunger guide 46. The outer closed end of the plunger guide is provided with a guide bore 47 in which the plunger 44 is slidingly mounted. The plunger 44 has a head 50 at its inner end that is of a suitable diameter to seat effectively into a longitudinal flute 10 of the tap. A suitable helical spring 51 surrounds the plunger 44 in compression between the closed end of the plunger guide and the inner head 50 to continually urge the plunger radially inward. The outer end of the plunger 44 is provided with a second head or knob 52 which is used for manual retraction of the plunger and also serves as a stop to abut the closed end of the plunger guide 46 thereby to limit the inward radial movement of the plunger. It is apparent that with a tap in the fixture body, the plunger will normally press inward into a flute of the tap as the engaged flute is ground to hold the tap against rotation relative to the fixture body. The plunger may be manually retracted to permit indexing of the tap, i. e., rotation to bring the four lands 11 successively into position for grinding.

Preferably the means for releasably holding the tap T against rotation relative to the encircling fixture body 20, also includes a detent means in the form of a finger 55. The finger 55 is pivotally carried by a pin 56 mounted in a boss 57 and is positioned adjacent the end of the fixture body 20 to contact the longitudinal extension 25 of the body as best shown in Figure 4. Thus the longitudinal extension 25 serves as a stop to limit the inward movement of the finger 55 at a position where the end of the finger may abut one of the lands 11 of the tap in the manner shown. A suitable spring such as a leaf spring 58 yieldingly holds the finger 55 at its inner effective position. The spring 58 permits the finger to retract in the manner of a detent for rotation of the tap in one direction but blocks reverse rotation of the tap.

The manner in which the fixture serves its purpose may be readily understood from the foregoing description. To use the fixture for reconditioning a tap, it is merely necessary to manually retract the plunger 44 and insert the tap with the leading end of the tap against the inner face of the radial arm 26. The plunger 44 is then released to press inward into the flute 10 to be ground and to releasably restrain the tap against rotation relative to the encircling body 20. The tap will take a position in response to the pressure of the plunger that will permit the detent finger 55 to drop into an effective position as shown in Figures 2 and 4.

The operator then adjusts the position of the centering recess 27 as desired by temporarily loosening the screw 36 to permit shifting of the adjustable member 31. This adjustment, of course, determines the eccentricity with which the tap will oscillate. The operator then mounts the assembly of tap and fixture body between the two conical centers 30 of a machine tool, for instance a tool grinder, with attention as to which way the detent finger 55 should point to oppose the tendency of the tap to rotate in reaction to the grinding wheel. In Figures 2 and 4, the detent finger points in a direction to prevent counterclockwise rotation of the tap. If the detent finger is to oppose clockwise rotation, the assembly will be reversed end for end between the two conical centers 30.

The operator then adjusts the grinding wheel to any desired chamfer angle. For example, the grinding wheel may be positioned as indicated by the dotted lines 60 in Figure 1 to grind the flute engaged with the head 50. The grinding wheel is then brought into grinding position by manipulation of the cross feed of the machine tool and then the operator manually rocks the fixture body 20 about the axis of the two conical centers 30 to cause the chamfer to be ground on the nose of the tool to the desired chamfer angle and with the desired degree of relief or back off. When one of the four lands has been ground to the desired configuration, the plunger 44 is manually retracted temporarily, and the tap is rotated to bring the next succeeding land into grinding position.

The manner in which the fixture may be used for its purpose without the guidance of a pair of center elements 30 may be understood by referring to Figure 3 where the cylindrical peripheral surface 22 of the fixture body 20 is shown in tangential contact with a planar surface 63 of a fixed support 64. If the fixture body 20 is rotated in tangential contact with the surface 63 about its axis of peripheral curvature without being permitted to roll along the surface, the encircled tap will oscillate laterally since the axis of the tap is offset from the axis of curvature of the cylindrical peripheral surface.

This eccentricity of the peripheral cylindrical surface 22 relative to the axis of the tap-encircling passage 21, makes it possible to use the fixture for accurately grinding a tap by means of a simple grinding wheel without the benefit of a pair of conical centers. For example, to grind a tap by means of an upright grinding wheel rotating on a horizontal axis, it is merely necessary to provide a pointed support like the element 30 of Figure 1 and, as shown in Figure 3, to provide a suitably located fixed support 64 having a planar surface 63. In fact it is not essential that the surface 63 be planar. A curved surface to cradle one side of the fixture body 20 may be even more advantageous. With the centering recess 17 at the square end of the tap engaging the pointed support, and with the cylindrical peripheral surface 22 of the fixture body 20 resting against the support surface 63 at the desired angle relative to the grinding wheel, the fixture body may be rotated in frictional tangential contact with the surface 63 to oscillate the tap relative to the grinding wheel in a manner to produce the desired chamfer and degree of relief.

In all embodiments of the invention illustrated it should be noted that the means used for locating the flutes coacts with the cutting side of the flute being ground. Thus each flute is separately located at each operation of grinding to insure that each flute is separately located so that all flutes will be ground exactly the same amount and at the same angle. As the cutting edge of the flute to be ground is used to locate the flute itself and the tap is not located merely by its longitudinal axis, it is possible with devices embodying the present invention to grind and renovate taps with badly worn end faces and even broken taps.

My description in specific detail of a preferred practice of the invention will suggest to those skilled in the art various changes, substitutions and other departures from my disclosure that properly lie within the spirit and scope of the appended claims.

I claim:

1. A fixture of the character described for guidance in grinding the forward end of a tap to a desired chamfer angle with a desired degree of relief, comprising: a body having a longitudinal cylindrical passage to encircle the tap snugly with freedom for the tap to rotate in the passage and with the forward end of the tap exposed for grinding, said body having a portion positioned to extend laterally along one side of the encircled tap and across the leading end of the tap, said portion having a centering recess to face forward from the forward end of the encircled tap to receive the conical center of a machine tool, said centering recess being spaced from the axis of said passage whereby oscillating the body about said centering recess with the tap fixed relative to the body will oscillate the tap eccentrically for grinding eccentric relief clearance; and means carried by said body for releasable engagement with the encircled tap to prevent rotation of the tap relative to said body.

2. A fixture as set forth in claim 1 in which said means for releasable engagement with the encircled tap includes means extending retractibly inward from said body to engage a flute surface of the tap and also includes yielding means to urge said retractible means inward.

3. A fixture as set forth in claim 1 in which said means for releasable engagement with the tap includes a manually retractible plunger positioned radially in said body and includes spring means urging said plunger inwardly.

4. A fixture as set forth in claim 1 in which said means for releasable engagement with the tap includes: a finger pivotally mounted on said body to swing between an outer retracted position and an inner position with the end of the finger abutting the surface of a flute of the tap near the tap circumference; and a spring urging said finger inwardly.

5. A fixture as set forth in claim 4 in which said means for releasable engagement with the tap also includes: a manually retractible plunger positioned radially in said body; and spring means urging said plunger inwardly.

6. A fixture of the character described for guidance in grinding the forward end of a tap to a desired chamfer angle and with a desired degree of relief, comprising: a body having a longitudinal cylindrical passage to encircle the tap snugly with freedom for the tap to rotate in the passage and with the forward end of the tap exposed for grinding, said body having an extension positioned to extend laterally along one side of the encircled tap and terminating in a portion positioned to extend across the leading end of the tap; means carried by said body for releasable engagement with the encircled tap to prevent rotation of the tap relative to the body; and a member mounted on said terminal portion of the body, said member having a centering recess positioned to face forward from the forward end of the encircled tap to receive the conical center of a machine tool, said member being adjustable for selective spacing of said centering recess from the axis of said passage.

7. A fixture as set forth in claim 6 in which said member is slidably mounted between parallel guide shoulders on said terminal portion of the body; and in which means including a screw releasably fixes said member relative to said terminal portion.

8. A fixture as set forth in claim 7 in which said means for releasable engagement with the tap includes: a finger pivotally mounted on said body to swing between an outer retracted position and an inner position with the end of the finger abutting the surface of a flute of the tap near the tap circumference; and a spring urging said finger inwardly.

9. A fixture as set forth in claim 8 in which said means for releasable engagement with the tap also includes: a manually retractible plunger positioned radially in said body; and spring means urging said plunger inwardly.

References Cited in the file of this patent

UNITED STATES PATENTS

| | | |
|---|---|---|
| 318,071 | Woodbridge | May 19, 1885 |
| 323,006 | Whitney | July 28, 1885 |
| 1,363,194 | De Koning | Dec. 21, 1920 |
| 2,136,491 | Cornell | Nov. 15, 1938 |
| 2,398,661 | Miller | Apr. 16, 1946 |
| 2,420,572 | Southwick et al. | May 13, 1947 |
| 2,503,396 | Lentz | Apr. 11, 1950 |
| 2,672,714 | Wilson | Mar. 23, 1954 |

FOREIGN PATENTS

| | | |
|---|---|---|
| 26,748 | Great Britain | Dec. 3, 1907 |